(12) United States Patent
Farr

(10) Patent No.: US 6,778,270 B2
(45) Date of Patent: Aug. 17, 2004

(54) HOLOGRAPHIC DEMULTIPLEXOR

(75) Inventor: Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/243,305

(22) Filed: Sep. 13, 2002

(65) Prior Publication Data

US 2004/0051868 A1 Mar. 18, 2004

(51) Int. Cl.$^7$ .............................. G01J 3/14; G01J 3/18
(52) U.S. Cl. ...................................... 356/326; 356/328
(58) Field of Search ................................ 356/305, 326, 356/328

(56) References Cited

U.S. PATENT DOCUMENTS 5,315,423 A * 5/1994 Hong ........................ 398/79
5,329,384 A * 7/1994 Setani et al. ................. 358/514

* cited by examiner

Primary Examiner—F. L. Evans
(74) Attorney, Agent, or Firm—Workman Nydegger

(57) ABSTRACT

A holographic demultiplexor for filtering and spatially positioning individual optical channels, wavelengths, or sets of wavelengths. The holographic demultiplexor includes a volume hologram that includes holograms for redirecting wavelengths included in a light signal. A diffraction grating linearly disperses the light signal and the individual holograms included in the volume hologram spatially reflect the one or more wavelengths back to the diffraction grating as specific angles. The volume hologram spatially reflects the one or more wavelengths such that they are dispersed in two dimensions. The diffraction grating then reflects the two dimensionally dispersed wavelengths to a two dimensional detector array. The detectors of the detector array for adjacent wavelengths can be interleaved to reduce interference. Alternatively, the volume hologram can redirect sets of wavelengths directly to the detector array and the light is not linearly dispersed by a diffraction grating first.

26 Claims, 3 Drawing Sheets

HOLOGRAPHIC DEMULTIPLEXOR

BACKGROUND OF THE INVENTION

1. The Field of the Invention

This invention relates generally to optical spectroscopy devices and techniques. In particular, the present invention relates to optical filtration and spatial positioning devices for use in the analysis of multiple channels of a light signal.

2. The Relevant Technology

Spectroscopy is a well known technique that involves the production and investigation of the spectral content of polychromatic light. Such forms of light are made up of numerous different wavelengths, and spectroscopy allows for the analysis of these individual wavelengths. This form of analysis has broad applications in fields such as chemistry, biology and telecommunications. For example, a common application utilizes a device known as a spectroscope, which sends a light signal through a sample and then disperses the individual wavelengths of the emitted light signal onto a grid. The characteristics of the sample composition can then be identified depending on which wavelengths are actually emitted. The spectral information can be used to identify the sample in much the same way that a fingerprint can be used to identify an individual in that no two elements emit the same spectra.

Another important application of spectroscopy is in the field of optical communications. As a transmission medium, light provides a number of advantages over traditional electrical communication techniques. For example, light signals allow for extremely high transmission rates and very high bandwidth capabilities. Also, light signals are resistant to electromagnetic interferences that can interfere with electrical signals. Light also provides a more secure signal because it does not emanate the type of high frequency components often experienced with wire-based electrical signals. Light also can be conducted over greater distances without the signal loss typically associated with electrical signals on copper wire.

Another advantage in using light as a transmission medium is that multiple wavelength components of light can be transmitted through a single communication path such as an optical fiber. This process is commonly referred to as wavelength division multiplexing (WDM), where the bandwidth of the communication medium is increased by the number of independent wavelength channels used. Spectroscopy techniques can be used to investigate and verify the presence of these different wavelength channels by separating light signals into constituent wavelength sets, channel groups, or separate wavelengths.

One problem associated with the use of spectroscopy techniques—especially in optical communications—is the difficulty in dispersing the individual light signal wavelengths in a manner that can be efficiently and accurately detected at a high resolution. This is especially the case in dense wavelength division multiplexing (DWDM) applications where the individual wavelength communication channels are closely spaced to achieve higher channel density and total channel number in a single communication line. For example, most spectroscopy devices use a prism or a diffraction grating device as a dispersion member to separate wavelength components. However, these devices separate the wavelengths in a linear manner, such that they are dispersed along a particular line. Thus, to detect the dispersed wavelengths, detectors must be placed along a line in a corresponding plane. The number of required detectors is proportional to the number of detected wavelengths and desired resolution. Thus, to detect a broad range of wavelengths, a very long line of detectors must be employed, which takes up a relatively large amount of space and increases the overall cost and complexity of the optical communications system.

Another approach is to use a mechanical device to aim the different wavelengths at a single detector for correspondingly different time periods. For example, a rotating reflective diffraction grating can be used to direct the individual wavelengths to a single detector location for a specific time period. Again, this approach has several drawbacks. While it reduces the number of detectors required, it utilizes devices with moving parts and having relatively high mechanical complexity, thereby increasing cost and reducing reliability. Moreover, the approach can be inefficient. For example, if a large number of wavelengths are involved, the approach introduces a relatively large time delay, an especially undesirable characteristic in any communications application.

Yet another problem encountered when utilizing such spectral analysis techniques is related to the accurate detection of the particular channels in question. In particular, if the physical dispersion of individual wavelengths is too narrow or the sampling detectors elements too few, there is a risk of focusing unwanted wavelength(s) onto the same detector elements as the desired wavelength. This would obviously create noise and distort the information contained within the desired channel. More expensive high dispersion diffraction gratings can be obtained to disperse the wavelengths into a broader area and therefore onto a sufficient number of detector elements per wavelength channel to allow high resolution and accurate detection. However, this solution requires a large number of linear detector elements, additional space, and more complex and expensive focusing optics. Therefore, most spectroscopy applications must balance the need for higher resolution with the expense and size ramifications of using a broader dispersion member.

BRIEF SUMMARY OF THE INVENTION

These and other problems are addressed by embodiments of the present invention, which relates to a holographic demultiplexor or optical spectroscopy system that separates and images the constituent wavelengths of a light signal onto a two-dimensional detection device. Moreover, the holographic demultiplexor reflects and spatially positions selected wavelengths onto a two-dimensional detector array, as opposed to an unreasonably long linear detector array. Embodiments of the present invention are thus particularly suitable for spectral wavelength separation, as would be done in typical spectroscopy systems and applications.

In general, presently preferred embodiments include a volume hologram. The volume hologram includes a hologram for each wavelength or set of wavelengths that is included in the light signal. Each hologram reflects a particular range of wavelengths or a specific wavelength. In one embodiment, each wavelength is reflected at a particular orientation. This configuration allows the optical element to precisely reflect individual wavelengths that are dispersed from a dispersing member, such as a prism or a diffraction grating, towards specific points on a corresponding detector. The volume hologram can be used to provide two dimensions of spatial dispersion, thus facilitating the use of a two dimensional detector array.

The advantages of the present invention include the ability to individually filter and reflect optical wavelengths, or channels, to specific optical detector locations. By filtering and reflecting individual channels in this manner, embodiments of the present invention minimize the physical space otherwise needed for linearly detecting a broad range of wavelengths. In addition, the present invention maximizes resolution by efficiently utilizing a large number of detector elements, available in a two-dimensional detector array, for sampling individual wavelength channels.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF THE PREFERRED EMBODIMENTS

Reference will now be made to the drawings to describe embodiments of the invention. It is to be understood that the drawings are diagrammatic and schematic representations of the presently preferred embodiments, and are not limiting of the present invention, nor are they necessarily drawn to scale.

In general, the present invention relates to a holographic demultiplexor that receives a multi channel light beam and selectively reflects wavelengths at specific angles and distinct orientations. In this way, the holographic demultiplexor is capable of reflecting and spatially positioning selected wavelengths onto a corresponding detection area of a detection device. Embodiments of the present invention find particular use in high resolution optical spectroscopy systems such as might be used in optical communication or sample identification applications. However, it will be appreciated that the teachings of the present invention are applicable to other optical applications as well.

Figure 1:
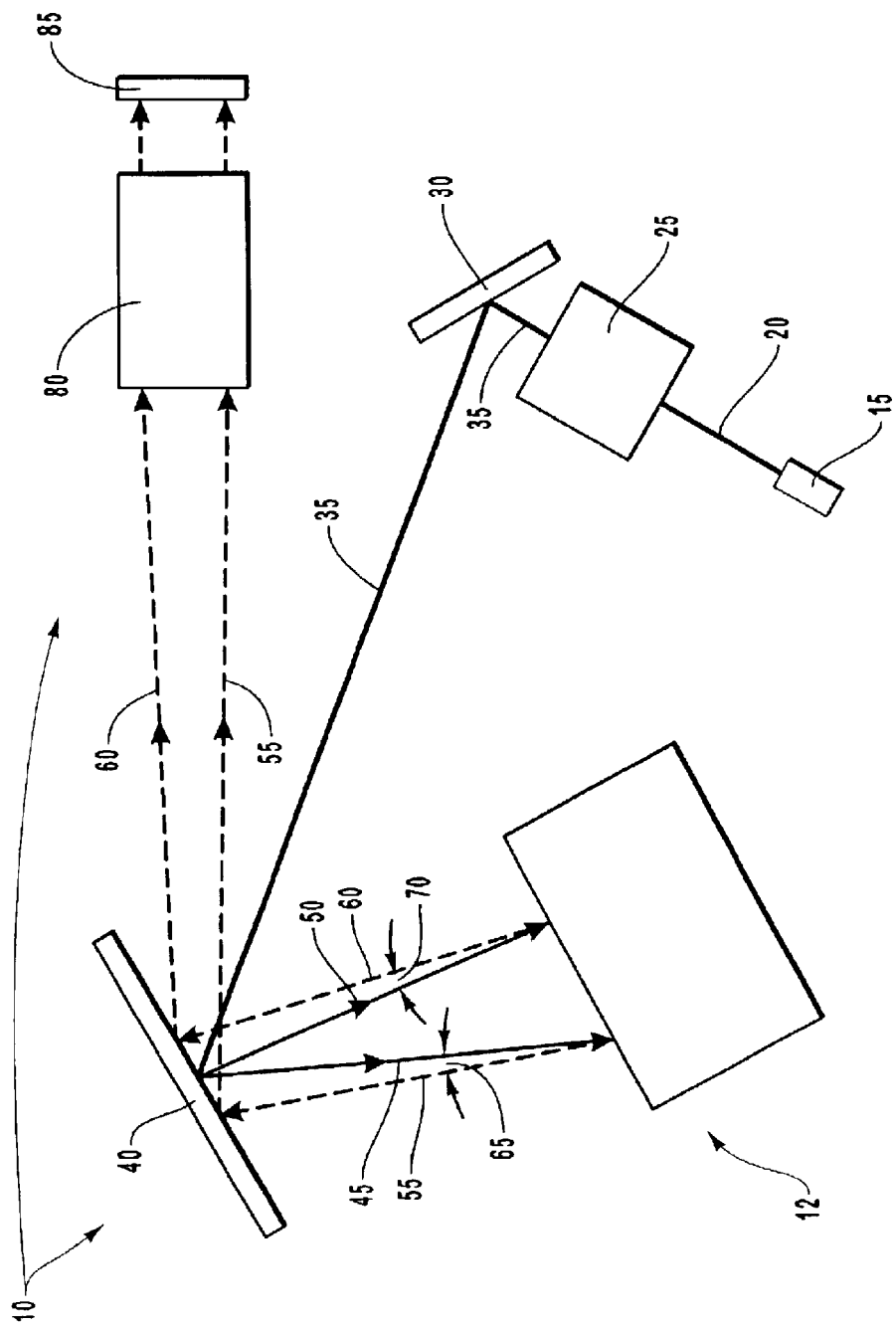
FIG. 1 illustrates an optical spectroscopy system using one embodiment of holographic demultiplexor for filtration and spatial manipulation of the individual channels or wavelengths of a light signal.

FIG. 1 illustrates a light signal 20 that is received from or carried by a light source 15. The light signal 20 typically has more than one constituent wavelength or channel and each separate channel can be used to transmit data. For example, the light signal 20 may be a signal included in a WDM system where each separate channel or wavelength is used to transmit data. Often, the light signal 20 is emitted onto collimating optics 25, which collimate the light signal 20, before being received by a holographic demultiplexor 10. Alternatively, the collimating optics 25 are included in the holographic demultiplexor 10.

The collimating optics 25 may include various positive and negative lenses that are positioned together to form a system that collimates the diverging light signal 20 emitted from the light source 15 into a collimated bean, represented by the collimated beam 35. The mirror 30 is used in this example to reflect the collimated beam 35 towards a specific location. Alternatively, the light source 15 and the collimating optics 25 can be positioned to direct the collimated beam 35 to a specific location without the use of the mirror 30.

The collimated beam 35 is received by the holographic demultiplexor 10 and is typically received by a diffraction grating 40 or other dispersion member. The collimated beam 35 is received such that it is incident on the diffraction grating 40 and reflected towards the volume hologram 12. The diffraction grating 40 is an optical element which linearly disperses or separates the wavelengths of an incident light beam similar to how a prism disperses light. Diffraction gratings are available with various line spacing (grating pitch) to accommodate various amounts of wavelength dispersion or channel separations in different optical systems.

Thus, the holographic demultiplexor 10 receives the collimated beam 35 at the diffraction grating 40, which linearly disperses the collimated beam onto the volume hologram 12. The collimated beam 35 is dispersed into a multitude of wavelength components by the diffraction grating 40. For illustration purposes, only two wavelengths 45 and 50 are illustrated in FIG. 1. The wavelengths 45 and 50 represent appropriately chosen adjacent wavelengths or channels within a set of wavelengths. The diffraction grating 40 divides the wavelengths included in the collimated beam 35 into a linear array of wavelengths in one embodiment and the linear array of wavelengths is incident on the volume hologram 12.

In one embodiment, the volume hologram 12 includes individual holograms to receive diffracted light from the diffraction grating and redirect the light in the specific manner required. More generally, each hologram can also function as the dispersing element (diffraction grating) to disperse and redirect individual sets of wavelengths from the collimated beam 35. Thus, the diffraction grating 40 could also be replaced by a volume hologram or similar dispersion element.

Each hologram in the volume hologram 12 thus reflects a separate wavelength while having little effect on other wavelengths. The volume hologram 12 permits as many different holograms to be created as necessary for a particular collimated beam. The separate holograms can be written one after another in the volume hologram 12 at low cost.

The volume hologram 12 can be used to redirect the wavelengths to spatially different locations. In this example, the volume hologram 12 reflects the wavelengths to specific locations on the diffraction grating 40. Thus, the wavelengths in the collimated beam 35 are reflected and dispersed a second time by the diffraction grating 40. The diffraction grating 40 then reflects the various wavelengths to focusing optics 80, which is a group of optical elements (such as lenses) that focus the incoming sets of dispersed wavelengths onto the detectors 85. While the diffraction grating introduced a first dimension of dispersion as the collimated beam is dispersed linearly, the volume hologram 12 introduced a second dimension of dispersion that enables the use of a two dimensional detector array 85. The focusing optics 80 image the two-dimensionally dispersed and deviated wavelengths onto the detector array 85.

The holographic demultiplexor 10 in FIG. 1 can be used to analyze, demultiplex, and/or detect the individual wavelengths or channels of the incoming light from the light source 15. The light source 15 shines divergent light 20, which includes the wavelengths 45 and 50, into the collimating optics 25. The light 20 is then collimated into a uniform beam 35 containing multiple wavelengths or channels. The uniform beam 35 is then reflected by the mirror 30 onto the diffraction grating 40. The diffraction grating 40 disperses the individual wavelengths one-dimensionally onto the volume hologram 12.

The wavelengths that correspond to individual holograms included in the volume hologram are reflected back to the diffraction grating 40 by the volume hologram 12. For example, the wavelength 45 is reflected back as the wavelength 55 by a particular hologram created in the volume hologram 12 while the wavelength 50 is reflected back, by another hologram created in the volume hologram 12, as the wavelength 60. Each hologram in the volume hologram 12 can be used to control the direction in which particular sets of wavelengths are reflected back to the diffraction grating. Thus, the volume hologram 12 is able to spatially position the reflected wavelengths onto a specific location of the diffraction grating 40. The volume hologram 12 thus introduces a second dimension of dispersion. The diffraction grating 40 then reflects each of the wavelengths reflected by the volume hologram 12 at a known angle onto the focusing optics 80. The focusing optics 80 then focuses the two dimensionally dispersed wavelengths onto the detector array 85.

In another embodiment, the diffraction grating 40 is not required and the volume hologram 12 can redirect sets of wavelengths to the detector array 85. In this example, the volume hologram 12 receives the light 35 and the holograms included in the volume hologram can redirect sets of wavelengths as specific angles to the detector array 85. Because the volume hologram is a redirective element that can reflect light at specific angles, the detectors of the detector array 85, as described below, can be arranged in two dimensions.

Figure 2:
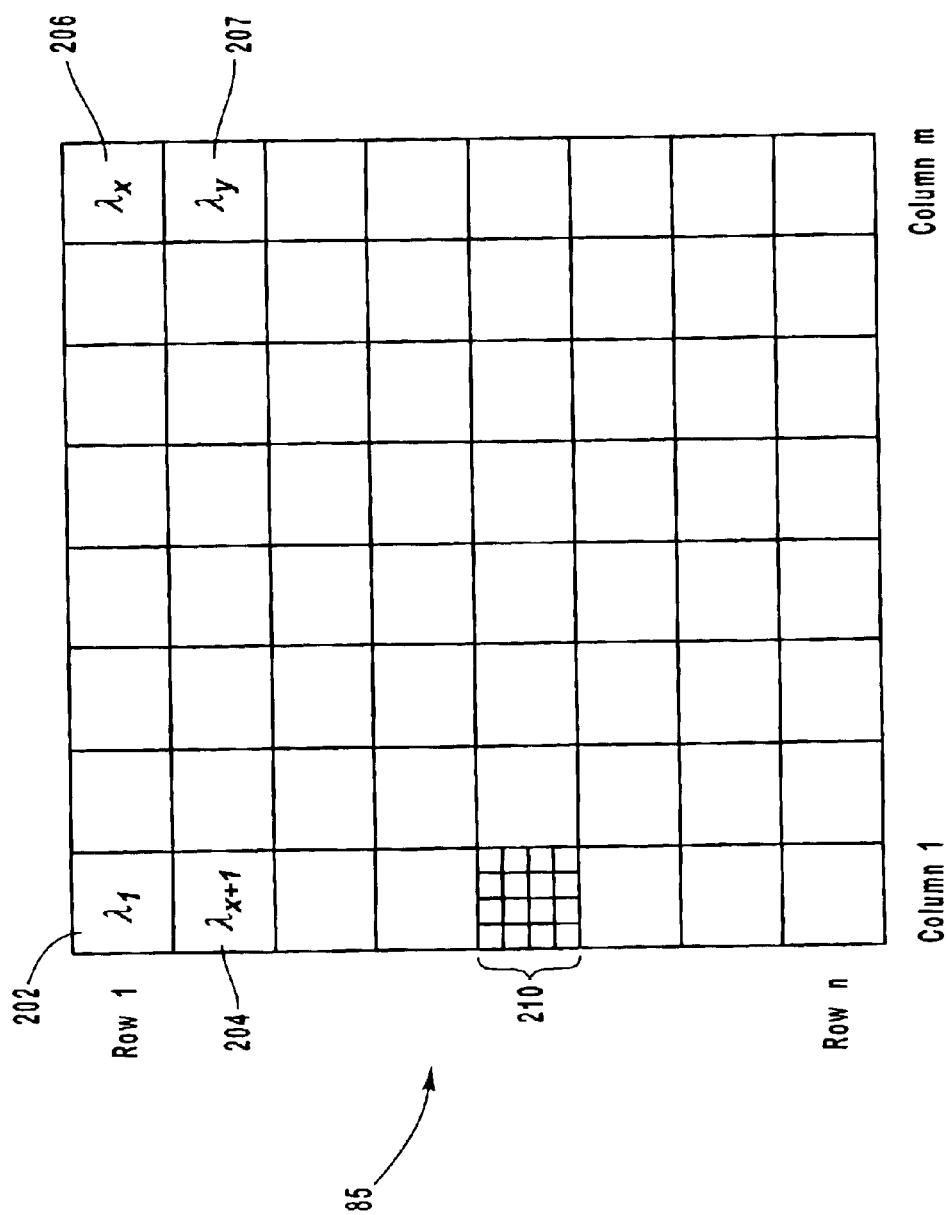
FIG. 2 is a block diagram that illustrates a two dimensional detector that detects the channels or wavelengths spatially positioned by the holographic demultiplexor.

FIG. 2 illustrates an example of the detector array 85 shown in FIG. 1. The detector array 85 includes a plurality of pixels or detectors that are arranged in a two dimensional array. In this example, the detector array 85 has N rows and M columns of detectors or pixels. The detector 202 in the first row is used to detect the wavelength $\lambda_1$. The last detector of the first row is used to detect the wavelength $\lambda_x$. The first detector 204 of the second row is then configured to detect the wavelength $\lambda_{(x+1)}$, while the last detector 207 of the second row is used to detect the wavelength $\lambda_y$.

In another embodiment, more than one pixel or detector can be used to detect a particular wavelength. Thus, the detector 202 may actually include several rows of pixels or detectors. This increases the efficiency of the detector array 85. For example, the detector 210 illustrates an instance where the detector 210 includes a sub-array of pixels or detectors.

Figure 3:
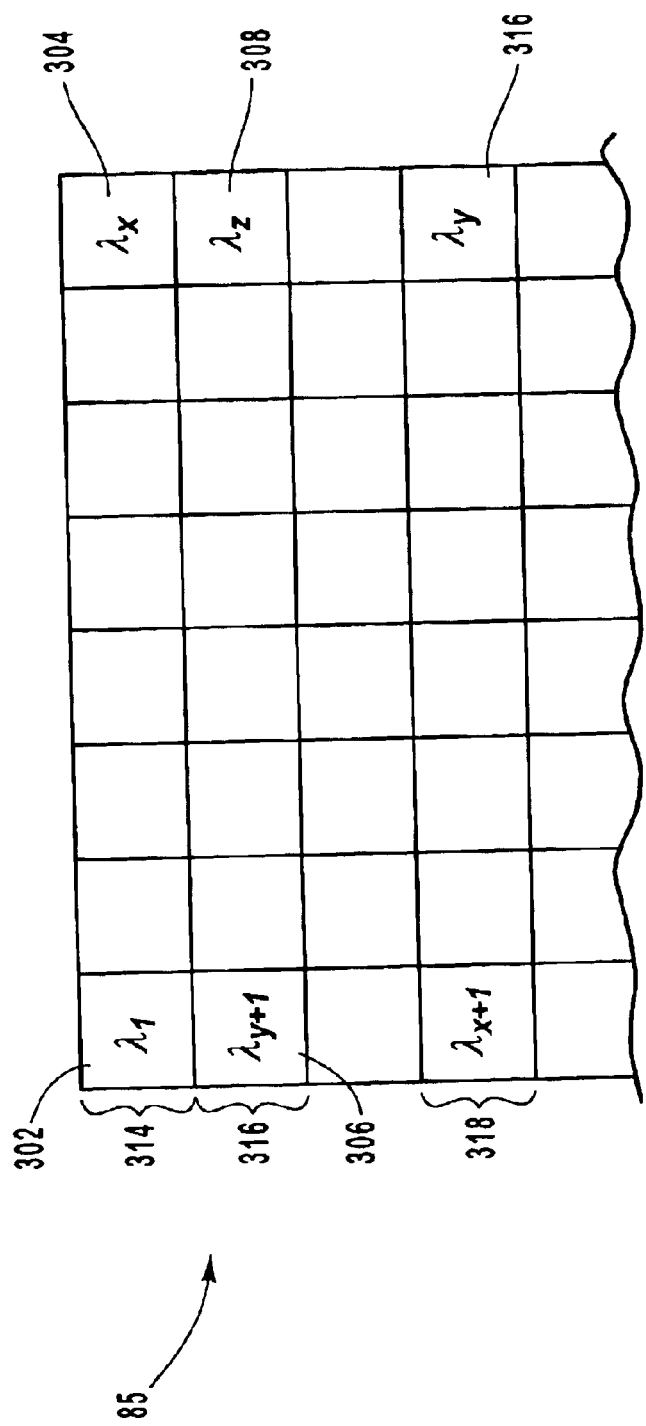
FIG. 3 is a block diagram of a two dimension detector illustrating that the channels or wavelengths spatially positioned by the holographic demultiplexor are interleaved to reduce interference.

FIG. 3 illustrates another example of a detector array 85. In this example, the wavelengths detected by a particular row are interleaved in order to reduce interference. The row 314, for instance, begins by detecting the wavelength $\lambda_1$ with the detector 302 and ends by detecting the wavelength $\lambda_x$ with the detector 304. The wavelength $\lambda_{x+1}$ is detected by the detector 310, which is not in a row that is adjacent to the row 314. In this example, the detector 310 is in the row 318. The row 318 ends by detecting the wavelength $\lambda_y$ with the detector 312. The wavelength $\lambda_{y+1}$ is detected by the detector 306, which is in the row 316 that is adjacent to the row 314. The row 316 ends with the detector 308, which detects the wavelength $\lambda_z$.

In this manner, the detectors in the detector array 85 can be interleaved such that interference is from other wavelengths (close channels) is reduced. In addition, there is no requirement that the wavelengths detected on a particular row be consecutive. In other words, the detector array 85 can arrange the individual wavelength detectors as desired. Also, more than one detector can be used to detect a particular wavelength. For example, a detector in for 214 and a detector in row 318 may be used to detect the wavelength $\lambda_b$.

The ability to spatially position the wavelengths in this manner is related to the volume hologram 12. As previously indicated, the individual holograms included in the volume hologram 12 can redirect the affected wavelengths to spatially distinct locations. This enables the use of a two dimensional detector as described above.

The holographic demultiplexor or optical spectroscopy system described herein can spatially disperse and detect, for example, a light signal that includes 40, 80, 120, or 160 channels. The present invention is not limited to these examples, but can disperse and detect more or less channels as needed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A holographic demultiplexor for spatially separating wavelengths in a light signal, the holographic demultiplexor comprising:
    a dispersion member configured to receive the light signal and disperse the light signal into one or more wavelengths;
    a volume hologram that receives the one or more wavelengths dispersed by the dispersion member, wherein the volume hologram includes a hologram for each of the one or more wavelengths included in the light signal, wherein each hologram reflects a particular wavelength such that the one or more wavelengths are dispersed in at least two dimensions; and
    a detector array capable of detecting the one or more wavelengths that are reflected from the volume hologram.

2. A holographic demultiplexor as defined in claim 1, wherein the dispersion member comprises a diffraction grating.

3. A holographic demultiplexor as defined in claim 1, wherein the dispersion member comprises a prism.

4. A holographic demultiplexor as defined in claim 1, further comprising
    focusing optics that are configured to focus the one or more wavelengths reflected from the volume hologram onto the detector array.

5. A holographic demultiplexor as defined in claim 1, further comprising
    collimating optics configured to collimate the received light signal.

6. A holographic demultiplexor as defined in claim 1, wherein the detector array further comprises rows and columns of detectors.

7. A holographic demultiplexor as defined in claim 6, wherein the detector array further comprises one or more rows of detectors that are arranged such that rows of detectors for adjacent wavelengths of the light signal are interleaved.

8. A holographic demultiplexor as defined in claim 1, wherein each hologram is a transmission hologram of a diffraction grating for a particular wavelength.

9. A holographic demultiplexor as defined in claim 1, wherein multiple holograms included in the volume hologram diffract and redirect light of a particular wavelength or a set of wavelengths in a particular direction.

10. An optical spectroscopy system for detecting the constituent wavelengths of light or sets of wavelengths included in a light signal, the optical spectroscopy system comprising:
  a diffraction grating that receives the light signal, wherein the diffraction grating linearly disperses the light signal into one or more wavelengths;
  a volume hologram that receives the linearly dispersed light signal, wherein the volume hologram includes an individual hologram for each set of wavelengths, wherein
    each hologram reflects a corresponding set of wavelengths back to the diffraction grating such that the one or more wavelengths reflected by the individual holograms are dispersed in two dimensions; and
  a two dimensional detector array that detects the one or more wavelengths, wherein the diffraction grating reflects the two dimensionally dispersed wavelengths received from the volume hologram to the detector array.

11. An optical spectroscopy system as defined in claim 10, further comprising focusing optics that are configured to focus the one or more wavelengths reflected from the volume hologram onto the detector array.

12. An optical spectroscopy system as defined in claim 10, further comprising collimating optics configured to collimate the received light signal onto the diffraction grating.

13. An optical spectroscopy system as defined in claim 10, wherein the detector array further comprises rows and columns of detectors.

14. An optical spectroscopy system as defined in claim 13, wherein the detector array further comprises one or more rows of detectors, wherein rows of detectors for adjacent wavelengths of the light signal are interleaved to reduce interference.

15. An optical spectroscopy system as defined in claim 10, wherein each hologram is a hologram of a diffraction grating for a particular wavelength.

16. An optical spectroscopy system as defined in claim 10, wherein each hologram is a redirective element for a particular set of wavelengths.

17. A holographic demultiplexor for spatially dispersing wavelengths in a light signal into two dimensions, the holographic demultiplexor comprising:
  a dispersion member that receives the light signal, wherein the light signal includes one or more wavelengths and where the dispersion member linearly disperses the one or more wavelengths; and
  a volume hologram that includes a holographic diffraction grating for each of the one or more wavelengths, wherein each holographic diffraction grating created in the volume hologram reflects a particular wavelength received from the dispersion member such that the one or more wavelengths are dispersed in two dimensions.

18. A holographic demultiplexor as defined in claim 17, wherein the dispersion member comprises a diffraction grating.

19. A holographic demultiplexor as defined in claim 17, wherein the dispersion member comprises a prism.

20. A holographic demultiplexor as defined in claim 17, further comprising focusing optics that are configured to focus the two dimensionally dispersed wavelengths onto a detector array, wherein the diffraction grating directs the two dimensionally dispersed wavelengths reflected by the volume hologram to the focusing optics.

21. A holographic demultiplexor as defined in claim 17, further comprising collimating optics configured to collimate the received light signal before the light signal is linearly dispersed by the dispersion member.

22. A holographic demultiplexor as defined in claim 17, further comprising a two dimension detector array for detecting the two dimensionally dispersed wavelengths.

23. A holographic demultiplexor as defined in 22, wherein the detector array further comprises rows and columns of detectors.

24. A holographic demultiplexor as defined in claim 23, wherein the detector array further comprises one or more rows of detectors that are arranged such that rows of detectors for adjacent wavelengths of the light signal are interleaved.

25. A holographic demultiplexor for spatially separating wavelengths in a light signal, the holographic demultiplexor comprising:
  a volume hologram configured to receive the light signal and disperse the light signal into one or more wavelengths at specific angles;
  a detector array capable of detecting the one or more wavelengths that are dispersed by the volume hologram; and
  a dispersion member that linearly disperses the light received by the volume hologram.

26. A holographic demultiplexor as defined in claim 25, wherein the volume hologram includes a different hologram for each set of wavelengths included in the light signal.

* * * * *

UNITED STATES PATENT AND TRADEMARK OFFICE
CERTIFICATE OF CORRECTION

PATENT NO. : 6,778,270 B2
DATED : August 17, 2004
INVENTOR(S) : Mina Farr

It is certified that error appears in the above-identified patent and that said Letters Patent is hereby corrected as shown below:

<u>Title page,</u>
Item [57], ABSTRACT,
Line 8, after "diffraction grating" change "as" to -- at --.

<u>Drawings,</u>
Figure 3, the left-hand cell of row "318", labeled as "$\lambda_{x+1}$" should be labeled as "310"; and the cell of row "316" should be labeled "312".

<u>Column 4,</u>
Line 9, before "represented" change "bean" to -- beam --.

<u>Column 5,</u>
Line 51, before "of the first row" insert -- 206 --.

<u>Column 6,</u>
Line 9, after "interference" remove "is".
Line 14, after "detector in for" change "214" to -- 314 --.

Signed and Sealed this

Second Day of May, 2006

JON W. DUDAS
*Director of the United States Patent and Trademark Office*